(12) United States Patent
Jung et al.

(10) Patent No.: US 10,758,805 B2
(45) Date of Patent: Sep. 1, 2020

(54) DIGITAL PUTTING DIAGNOSIS DEVICE

(71) Applicant: WOOAM Hitech CO., LTD., Gyeonggi-do (KR)

(72) Inventors: Dong Kwan Jung, Gyeonggi-do (KR); Tae Hwan Moon, Seoul (KR); Young San Jean, Gyeonggi-do (KR)

(73) Assignee: WOOAM Hitech CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/274,887

(22) Filed: Feb. 13, 2019

(65) Prior Publication Data

US 2020/0078655 A1 Mar. 12, 2020

(30) Foreign Application Priority Data

Sep. 6, 2018 (KR) .................. 10-2018-0106337

(51) Int. Cl.
*A63B 69/36* (2006.01)
*A63B 53/00* (2015.01)
*A63B 53/04* (2015.01)

(52) U.S. Cl.
CPC ........ *A63B 69/3685* (2013.01); *A63B 53/007* (2013.01); *A63B 53/0487* (2013.01); *A63B 2220/833* (2013.01)

(58) Field of Classification Search
CPC ............ A63B 69/3632; A63B 2220/40; A63B 2225/50; A63B 2220/803; A63B 2220/833; A63B 69/36; A63B 2220/836; A63B 60/46; A63B 69/3623; A63B 71/0622; A63B 2102/32; A63B 2220/30;
(Continued)

(56) References Cited

U.S. PATENT DOCUMENTS 7,821,407 B2 * 10/2010 Shears ................. A61B 5/1127
340/573.1
9,079,060 B2 * 7/2015 Hong ..................... A63B 71/06
(Continued)

FOREIGN PATENT DOCUMENTS

KR 10-2005-0096658 A 10/2005
KR 10-2010-0036859 A 4/2010
(Continued)

OTHER PUBLICATIONS

Office Action from corresponding Korean Patent Application No. 10-2018-0106337, dated Oct. 31, 2018.

*Primary Examiner* — Nini F Legesse
(74) *Attorney, Agent, or Firm* — Harness, Dickey & Pierce, P.L.C.

(57) ABSTRACT

Provided is a digital putting diagnosis device for diagnosing putting, which is provided in a putter head of a golf putter, including: a 9-axis sensor unit for detecting position and movement of the putter head, the 9-axis sensor unit detecting rotation of the putter head in a roll direction, a pitch direction, and a yaw direction; a control unit for controlling the posture of the putter head at the time of addressing the putting and the swing path of the putter head during putting to be displayed in real time by using the detected signal of the 9-axis sensor unit according to the movement of the putter head; and a display unit for displaying the posture of the putter head and the swing path of the putter head under the control of the control unit.

7 Claims, 4 Drawing Sheets

(58) Field of Classification Search
CPC ............ A63B 2220/44; A63B 24/0006; A63B 2220/12; A63B 24/0062; A63B 60/42; A63B 2024/0068; A63B 2220/16; A63B 71/0619; A63B 2225/685; A63B 53/0487; A63B 69/3608; A63B 69/3685; A63B 53/00
USPC .................................. 473/220–223, 236, 266
See application file for complete search history.

(56) References Cited

U.S. PATENT DOCUMENTS

| | | | | |
|---|---|---|---|---|
| 2005/0020369 | A1* | 1/2005 | Davis | A63B 69/3614 473/131 |
| 2007/0219744 | A1* | 9/2007 | Kolen | G01C 19/00 702/150 |
| 2011/0053698 | A1* | 3/2011 | Stites | A63B 69/36 473/223 |
| 2012/0052972 | A1* | 3/2012 | Bentley | A63B 24/0006 473/223 |
| 2013/0102419 | A1* | 4/2013 | Jeffery | G09B 19/0038 473/409 |
| 2013/0165246 | A1* | 6/2013 | Jeffery | A63B 69/3623 473/223 |
| 2013/0225309 | A1* | 8/2013 | Bentley | A63B 69/36 473/266 |
| 2013/0267339 | A1* | 10/2013 | Boyd | A63B 69/36 473/223 |

FOREIGN PATENT DOCUMENTS

| | | |
|---|---|---|
| KR | 10-1262231 B1 | 5/2013 |
| KR | 10-2017-0083238 A | 7/2017 |
| KR | 10-1813520 B1 | 12/2017 |
| KR | 10-1836000 B1 | 3/2018 |

* cited by examiner

DIGITAL PUTTING DIAGNOSIS DEVICE

CROSS-REFERENCE TO RELATED APPLICATION

This application claims priority to Korean Patent Application No. 10-2018-0106337, filed on Sep. 6, 2018 in the Korean Intellectual Property Office, the disclosure of which is incorporated herein by reference in its entirety.

FIELD

The present invention relates to a golf putter, and more particularly, to a digital putting diagnosis device that diagnoses and displays a position, a direction, a movement, and the like of a putter head in a golf putter.

BACKGROUND

In general, golf is a game in which players successively hit golf balls with clubs along a predetermined course until the players insert the golf balls in a hole cup and a winner is determined based on the smallest number of hits. Recently, with an increase in leisure time, an increase in income, a recognition of the importance to health and exercise, and an increase in ecological need for space for sports and leisure activities, the golf has become a sport that many people enjoy in the world since the golf was created in the UK.

A golf course usually is configured with 18 holes including 10 holes that the player can reach the putting green with 2 hits, 4 holes that the player can reach the putting green with 3 hits, and 4 holes that the player can reach the putting green with 1 hit. For each hole, a standard number of times of hitting is set.

On the other hand, putting denotes a stroke of hitting a golf ball placed on a putting green with a putter in order to insert the golf ball in a hole cup. As the number of times of putting for 18 holes, 36 hits are set as standard number of times of hitting. In the case of a golfer reaching a certain level, the putting is a very important action since it is determined whether or not the total number of times of hitting can be reduced depending on how precisely the putting is made.

For example, in the case of golfers reaching a certain level, in most cases, the golfers can reach the putting green with the same number of times of hitting, but the ranks of the golfers are determined depending on the number of times of putting the golf ball into the hole cup on the putting green. If a putting stroke on the putting green cannot be performed correctly and a golfer misses a putting that the golfer may succeed in, a psychological stress will adversely affect the play in the next hole.

Thus, in order to accurately perform a putting stroke, which is very important in a golf game, an appropriate address posture and accurate, stable putting swing are required. In addition, it is necessary to accurately determine a distance from the golf ball to the hole cup and the state of the putting green. In addition, it is also necessary to hit the golf ball with the most suitable strength according to the distance and the state of the butting green.

Accordingly, golfers repeatedly train putting strokes to make putting more accurate. However, there is a problem in that it is difficult to maintain the correct putting feeling because the putting strength must be adjusted only by feeling at the time of training. In the case of putting training in a training place except for an actual putting green, there is a problem in that efficient training cannot be performed at all because the putting cannot be trained at the actual putting distance due to the small size of the training place.

In the putting, especially short putting of 2 m or less, the straightness of the putter head is an important factor in determining whether the putting is successful.

Thus, during the putting, putting is practiced in various ways in order to make the putter head straight ahead along the straight direction.

In such a putting practice, if the golfer can accurately check the direction of the putter head visually in real time, it is a great help to improve the straightness of putting.

In the related art, a number of related techniques for improving the straightness of putting have been disclosed. These related arts disclose a putting direction or a putting distance before the putting. However, these related art techniques have disadvantages in that the direction of the putter head cannot be measured and displayed during the actual putting process. In other words, in the related art, the putting of the golfer can be corrected by allowing the golfer to check whether or not the golfer actually performs the putting in a straight line. However, the movement of the putter head cannot be measured and the straightness or direction cannot be displayed to the golfer performing putting practice in real time during the putting, and thus, there is a limitation in the putting correction.

Korean Unexamined Patent Publication No. 10-2005-0096658 (published on Oct. 10, 2005) is a cited document.

SUMMARY

The present disclosure is to provide a digital putting diagnosis device that can help improve directionality and straightness of putting by diagnosing and displaying, in real time, an accurate address posture of putter head before putting and an accurate swing posture during putting by using a 9-axis sensor.

The objects of the present invention are not limited to the above-mentioned objects, and other objects not mentioned can be clearly understood by those skilled in the art from the following description.

According to an aspect of the present invention, there is provided a digital putting diagnosis device for diagnosing putting, which is provided in a putter head of a golf putter, including: a 9-axis sensor unit for detecting position and movement of the putter head, the 9-axis sensor unit detecting rotation of the putter head in a roll direction, a pitch direction, and a yaw direction; a control unit for controlling the posture of the putter head at the time of addressing the putting and the swing path of the putter head during putting to be displayed in real time by using the detected signal of the 9-axis sensor unit according to the movement of the putter head; and a display unit for displaying the posture of the putter head and the swing path of the putter head under the control of the control unit.

In the above aspect of the present invention, the control unit may perform a real-time zero point adjusting function of setting position and direction of the putter head as reference position and direction if the putter head does not moves in a Z axis direction for a predetermined time, display the reference position and direction on the display unit, and display a changed angle on the display unit in real time when the putter head rotates about the Z axis if the reference position and direction are set.

In the above aspect of the present invention, the control unit may display the changed position and direction on the display unit in different colors according to the changed position and direction of the putter head as the putter head rotates about a Z axis.

In the above aspect of the present invention, the control unit may display the changed position and the direction on the display unit in different colors according to a forward direction and a backward direction of the putter head as the putter head rotates about an X axis and a Y axis.

In the above aspect of the present invention, the putter head may further include an illuminance sensor for detecting indoor light or outdoor light, and the control unit may receive the detected light information from the illuminance sensor so that screen brightness of the display unit is automatically adjusted.

In the above aspect of the present invention, the control unit may read an X axis value and a Y axis value of the putter head from the 9-axis sensor unit and display the swing path of the putter head on the display unit in real time by using the values.

In the above aspect of the present invention, the digital putting diagnosis device may further include an alarm unit for outputting an alarm sound, wherein the control unit causes the alarm unit to output the alarm sound when the position and direction of the putter head coincide with the reference position and direction.

In the above aspect of the present invention, the digital putting diagnosis device may further include a vibration unit for outputting vibration, wherein the control unit causes the vibration unit to output the vibration when the position and direction of the putter head coincide with the reference position and direction.

According to the present invention, it is possible to obtain an effect of visually checking directionality and straightness of putting at the time of putting practice by diagnosing and displaying a position, direction, movement, swing path, and the like of the putter head in real time by using a 9-axis sensor, and it is possible to obtain an effect of correcting an address posture and a swing posture of a golfer by diagnosing a position and rotation of a putter head in a yaw direction.

DETAILED DESCRIPTION

Figure 1:
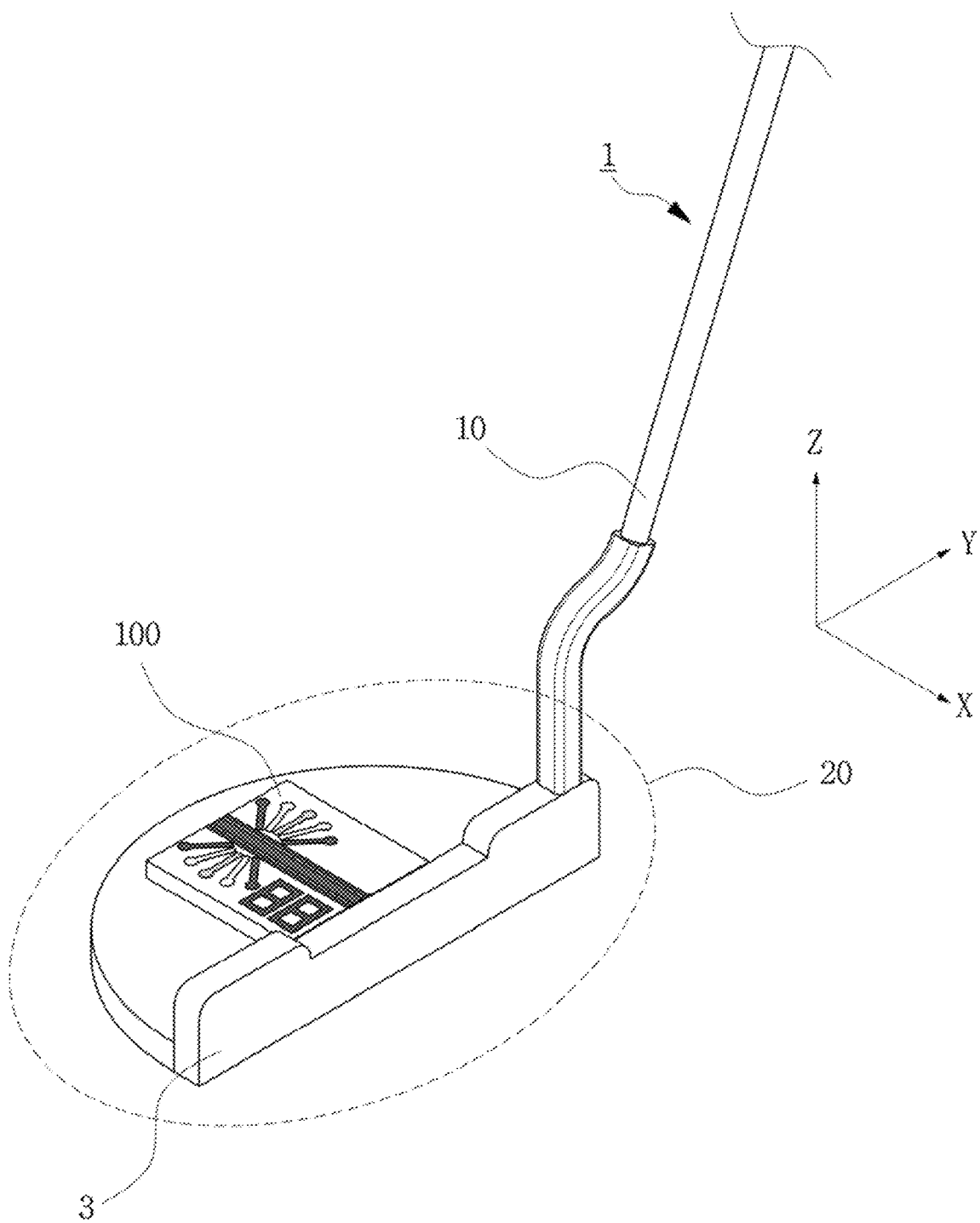
FIG. 1 is a perspective diagram of a golf putter according to an embodiment of the present invention.

The present invention may include various embodiments and various modifications, and specific embodiments are illustrated in the drawings and described in detail.

It is to be understood that the invention is not to be limited to the specific embodiments but includes all modifications, equivalents, and alternatives falling within the spirit and scope of the invention.

The terminology used in this application is used only to describe specific embodiments and is not intended to limit the invention.

The singular representation includes plural representation unless the context clearly dictates otherwise.

In this application, the terms "comprises" or "have", and the like, are used to specify that there exits a feature, a figure, a step, an operation, an element, a part or a combination thereof, and thus, it should be understood that existence or addition of one or more other features, numbers, steps, operations, elements, parts, or combinations thereof is not precluded in advance.

Unless otherwise defined, all terms used herein, including technical or scientific terms, have the same meaning as commonly understood by one of ordinary skill in the art to which this invention belongs.

The terms such as those defined in commonly used dictionaries are to be interpreted as having a meaning consistent with the contextual meaning of the related art and are not to be interpreted as ideal or overly formal in meaning unless explicitly defined in the present application.

In the following description with reference to the accompanying drawings, the same components are denoted by the same reference numerals, and redundant description thereof will be omitted. In describing the present invention, if it is determined that a specific description of the related art may unnecessarily obscure the spirit of the present invention, detailed description thereof will be omitted.

FIG. 1 is a perspective diagram of a golf putter according to an embodiment of the present invention.

Referring to FIG. 1, the golf putter 1 includes a putter shaft 10 and a putter head 20. The putter head 20 is provided with a head face 3, which is a flat face striking a golf ball.

A digital putting diagnosis device 100 according to the embodiment of the present invention is installed in a putter head 20 and displays a direction of a putter head, a swing path, and the like for diagnosis of putting.

Figure 2:
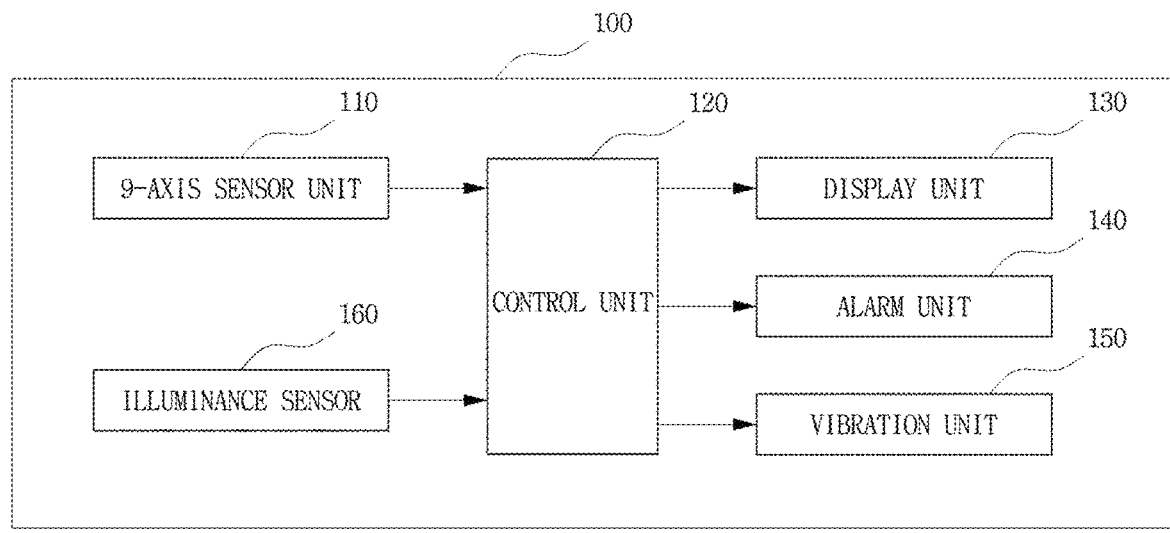
FIG. 2 is a block diagram illustrating an internal configuration of a digital putting diagnosis device according to an embodiment of the present invention.

FIG. 2 is a block diagram illustrating an internal configuration of the digital putting diagnosis device according to the embodiment of the present invention.

Referring to FIG. 2, the digital putting diagnosis device 100 according to the embodiment of the present invention includes a 9-axis sensor unit 110, an illuminance sensor 160, a control unit 120, a display unit 130, an alarm unit 140, and a vibration unit 150.

The 9-axis sensor unit 110 is configured with an acceleration 3-axis sensor, a gyro 3-axis sensor, and a geomagnetic 3-axis sensor for detecting the position, direction, speed, and the like. The 9-axis sensor unit 110 serves to detect the position and movement of the putter head and detect the rotations about the roll direction, the pitch direction, and the yaw direction.

The illuminance sensor 160 serves to detect indoor light or outdoor light by using a CSD illuminance sensor or the like.

Figure 5:
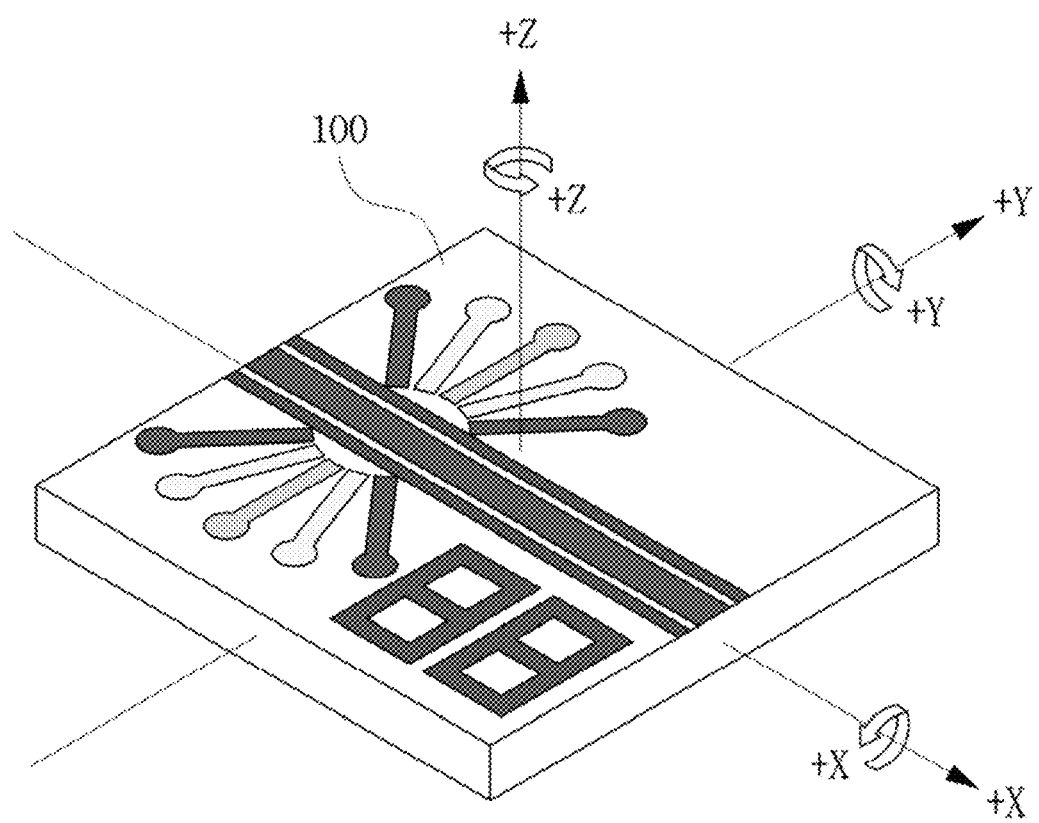
FIG. 5 is an exemplary diagram illustrating a rotation axis in a digital putting diagnosis device according to the embodiment of the present invention.

FIG. 5 is an exemplary diagram illustrating a rotation axis in the digital putting diagnosis device according to the embodiment of the present invention.

Referring to FIG. 5, in the digital putting diagnosis device 100 according to the embodiment of the present invention, the direction perpendicular to the head face 3 is set to an X-axis which is the roll direction, the direction parallel to the head face 3 is set to a Y axis which is a pitch direction, and the direction perpendicular to the ground is set to a Z axis direction which is a yaw direction.

As illustrated in FIG. 1, in the digital putting diagnosis device 100 according to the embodiment of the present invention, it is preferable that a path center line 132 of the display unit 130 is perpendicular to the head face 3.

The control unit 120 displays the position and rotation of the putter head in the Z axis direction on the display unit 130 in real time by using the signal detected by the 9-axis sensor unit 110, displays the swing path on the display unit 130 in real time, and causes the cumulative number of times of hitting of the golf ball by the putter head 20 to be displayed in real time.

Under the control of the control unit 120, the display unit 130 displays the position and rotation of the putter head 20 in the Z-axis direction, displays the swing path of the putter head, and displays the number of times of hitting of the golf ball by the putter head.

In the embodiment of the present invention, the control unit 120 may perform a real-time zero point adjusting function of setting the position and direction of the putter head 20 as reference position and direction if the putter head 20 has does not move in the Z axis direction for a predetermined time. And then, the control unit displays the reference position and direction on the display unit 130 and and displays a changed angle on the display unit 130 in real time when h the putter head 20 rotates about the Z axis if the reference position and direction are set.

In the embodiment of the present invention, the control unit 120 displays the changed position and direction of the putter head 20 on the display unit 130 in different colors depending on the changed position and direction of the putter head 20 as the putter head 20 rotates about the Z axis. In one embodiment of the present invention, the control unit 120 reads the X-axis value and the Y-axis value of the putter head 20 from the 9-axis sensor unit 110 and displays the swing path of the putter head on the display unit 130 in real time by using the values.

The alarm unit 140 serves to output an alarm sound.

In an embodiment of the present invention, the control unit 120 causes the alarm unit 140 to output the alarm sound when the position and direction of the putter head 20 coincide with the reference position and direction.

The vibration unit 150 serves to output the vibration.

In an embodiment of the present invention, the control unit 120 causes the vibration unit 150 to output the vibration when the position and direction of the putter head 20 coincide with the reference position and direction.

Figure 3:
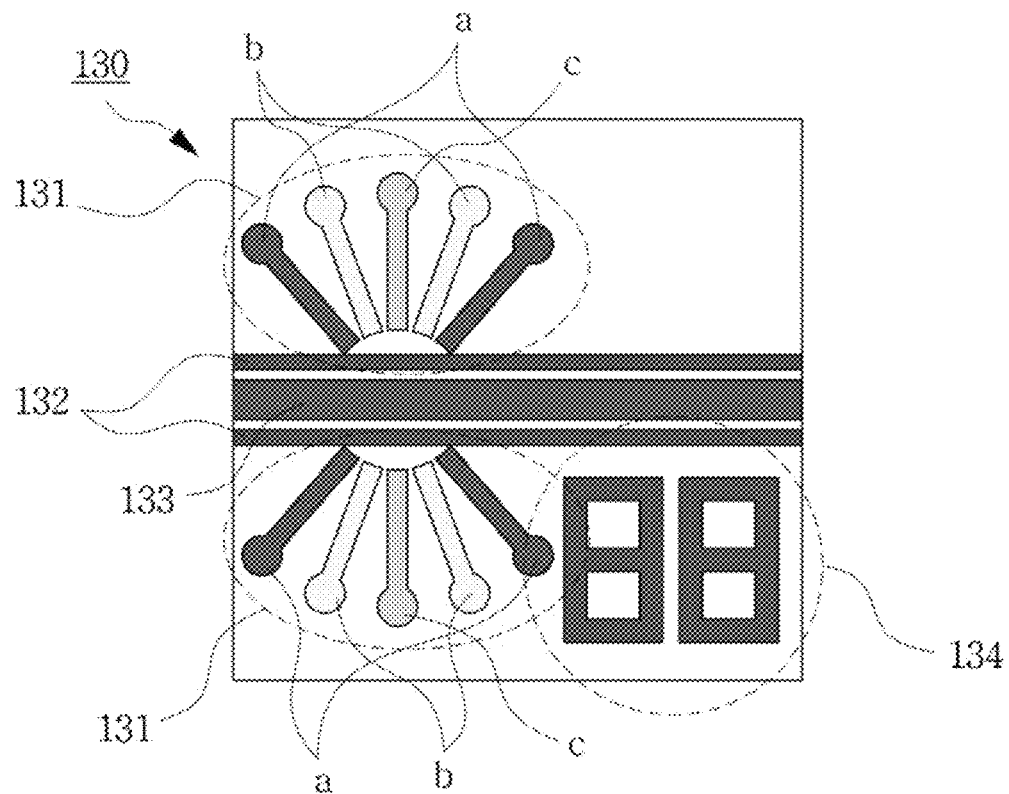
FIG. 3 and FIG. 4 are diagrams illustrating a display unit of a digital putting diagnosis device according to the embodiment of the present invention.
Figure 4:
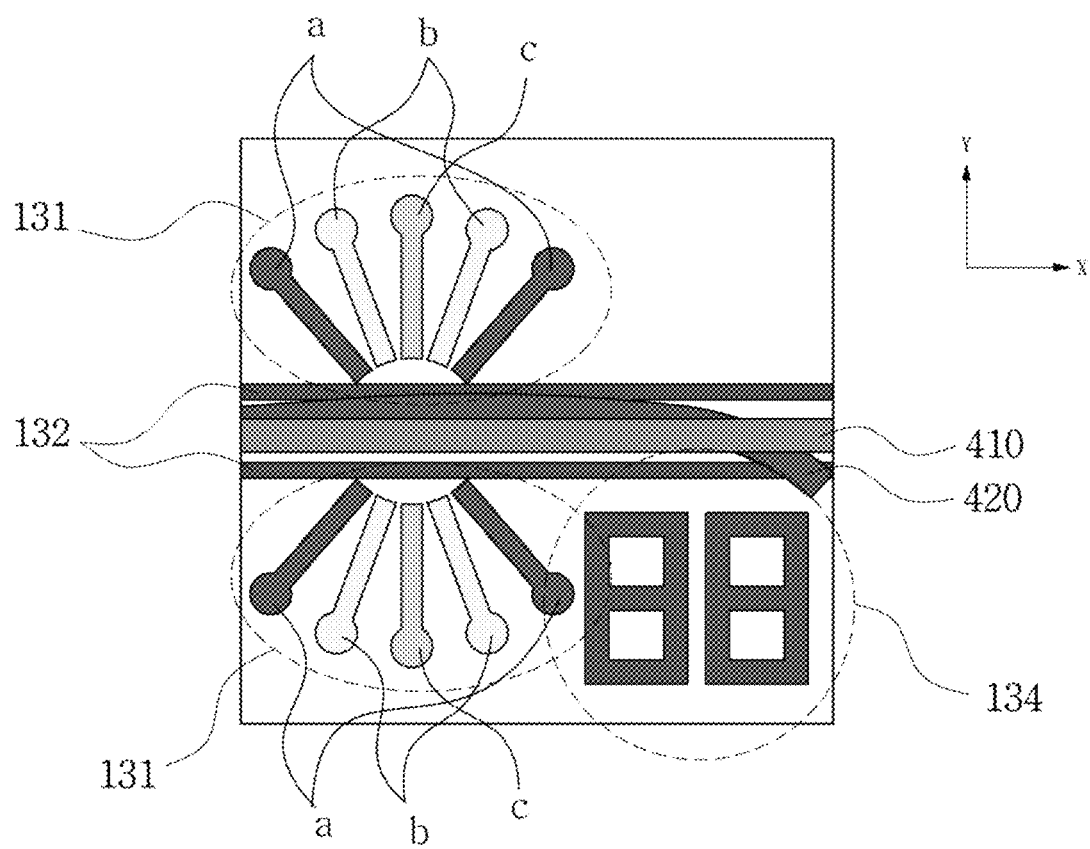

FIGS. 3 and 4 are diagrams illustrating a display unit of the digital putting diagnosis device according to the embodiment of the present invention.

Referring to FIGS. 3 and 4, in the embodiment of the present invention, on the display unit 130, a putter rotation angle 131 at an address position as a position where the putter head 20 touches the ground during the putting is displayed, the path center line 132 is displayed, the swing path 133 is displayed, and the number of times of hitting 134 is displayed.

In one embodiment of the present invention, the display unit 130 may be configured with a TFT LCD, an OLED, or the like.

In one embodiment of the present invention, the control unit 120 turns on the power of the display unit 130 when the putter head 20 is located within a predetermined angle or less, and the control unit turns off the power of the display unit 130 when a predetermined time elapses after the putter head deviates from the predetermined angle. For example, the control unit 120 turns on the power of the display unit 130 when the putter head 20 is located in the range of +5 degrees to −20 degrees with respect to the X axis and within ±20 degrees with respect to the Y axis, and the control unit 120 turns off the power of the display unit 130 after 5 seconds has elapsed from the time when the putter head deviates from the range.

The control unit 120 may perform a real-time zero point adjusting function of setting the position and direction of the putter head 20 at that time as reference position and direction if the putter head 20 does not move in the Z axis direction for a predetermined time. And then, the control unit displays the reference position and direction on the display unit 130 and and displays a changed angle on the display unit 130 in real time when h the putter head 20 rotates about the Z axis if the reference position and direction are set.

In the embodiment illustrated FIGS. 3 and 4, the first light emitting unit "a", the second light emitting unit "b", and the third light emitting unit "c" are included at the putter rotation angle 131. The first light emitting unit "a", emits red light, the second light emitting unit "b" emits yellow light, and the third light emitting unit "c" emits green light.

In the embodiment illustrated in FIGS. 3 and 4, when the zero point adjusting function is performed, the control unit 120 sets the position and angle of the putter head 20 at that time to 0 degrees, and the third light emitting unit "c" emits light at the putter rotation angle 131 of the display unit 130 to be displayed in green. At this time, if the angle of the putter head 20 is within ±2 degrees or less, the control unit 120 can allow the third light emitting unit "c" to emit light to be displayed in green.

When the putter head 20 rotates by a predetermined angle or more about the Z axis, the control unit 120 displays the position and angle of the putter head 20 at that time in different colors. In the embodiment illustrated in FIGS. 3 and 4, the control unit 120 causes the second light emitting unit "b" to emit light at the putter rotation angle 131 when the putter head 20 rotates by ±4 degrees about the Z axis to be displayed in yellow. Then, when the putter head 20 rotates by ±8 degrees about the Z axis, the first light emitting unit "a" emits light at the putter rotation angle 131 to be displayed in red.

As described above, in the present invention, the portion indicating the putter rotation angle 131 of the display unit 130 is set such that the green line of the third light emitting unit "c" is located at the center, the current position of the putter head 20 can be displayed in the form of a bar according to the rotation angle of the putter head 20, the second light emitting unit "b" can be displayed by a yellow line, and the first light emitting unit "a" can be displayed by a red line.

Therefore, the user can easily check the position of the current putter head 20 and adjust the putter head 20 to be located correctly in the address posture.

At the center of the display unit 130, two path center lines 132 are displayed.

In the present invention, the control unit 120 detects the moving path of the putter head 20 in real time and displays the moving path in the path center line 132.

That is, the control unit 120 sets 0 degree as a reference with respect to the X-axis and Y-axis, detects the movement of the putter head 20, and displays the swing path 133 in real time in the path center line 132. At this time, when the putter head 20 moves backward in the X axis direction, the swing path is displayed in second color 420, and when the putter head 20 moves forward, the swing path is displayed in first color 410.

For example, the first color 410 may be blue, and the second color may be red.

At this time, the angle range in which the swing path of the putter head 20 can be displayed can be set. For example, the angle range may be set to a range of 0 to 17 degrees with respect to the X axis and a range of ±5 degrees with respect to the Y axis.

The control unit 120 detects whether the golf ball has been hit by detecting the changed impulse and the time when the impact is generated through the putter head 20. When it is determined that the golf ball has been hit, the control unit displays the cumulative number of times of hitting on the display unit 130 in real time.

In the embodiment of the present invention, the control unit 120 turns off the power of the digital putting diagnosis device 100 when the putter head 20 deviates from the predetermined angle range for a predetermined time or more.

For example, the control unit 120 turns off the power when the putter head 20 deviates from the range of +5 degrees to −20 degrees with respect to the X axis and the range of ±20 degrees with respect to the Y axis for 3 minutes or more.

In one embodiment of the present invention, the control unit 120 can display a hitting error on the entire display unit 130 in a red blinking manner in a case where the rotation of the putter head 20 is ±2 degrees or more with respect to the Z axis at the hitting time.

In an embodiment of the present invention, the control unit 120 receives a signal from the illuminance sensor 160, which detects indoor light or outdoor light, and distinguishes the indoor and the outdoor from each other to automatically adjust the brightness of the screen of the display unit 130.

Accordingly, even in a case where the user uses the putting diagnosis device outdoors, the user can easily check the information displayed on the display unit 130 visually.

In the present invention, in order to reduce power consumption, the power of the digital putting diagnosis device 100 can be turned off when the display unit 130 is not turned on again for a predetermined time or more after being turned off.

For example, the power of the digital putting diagnosis device 100 can be turned off when the display unit 130 is not turned on again for three minutes or more after being turned off.

As illustrated in FIGS. 3 and 4, when the right side of the display unit 130 is set to the direction of the head face 3, a path center line 132 in which two white lines are formed in the horizontal direction is displayed, the swing path 133 is displayed in the path center line 132, the putter rotation angle 131 is displayed on a portion of the left side of the path center line 132, and the number of times of hitting 134 is displayed in the upper right side portion.

However, this configuration is only an embodiment, and a specific display method in the display unit 130 can be variously implemented.

While the invention has been described in terms of several preferred embodiments, these embodiments are illustrative and not restrictive.

It will be understood by those skilled in the art that various changes and modifications may be made therein without departing from the spirit of the invention and the scope of the appended claims.

What is claimed is:

1. A digital putting diagnosis device for diagnosing putting, which is provided in a putter head of a golf putter, comprising:
    a 9-axis sensor unit for detecting position and movement of the putter head, the 9-axis sensor unit detecting rotation of the putter head in a roll direction, a pitch direction, and a yaw direction;
    a control unit for controlling the posture of the putter head at the time of addressing the putting and the swing path of the putter head during putting to be displayed in real time by using the detected signal of the 9-axis sensor unit according to the movement of the putter head; and
    a display unit for displaying the posture of the putter head and the swing path of the putter head under the control of the control unit,
    wherein the putter head further includes an illuminance sensor for detecting indoor light or outdoor light, and
    wherein the control unit receives the detected light information from the illuminance sensor so that screen brightness of the display unit is automatically adjusted.

2. The digital putting diagnosis device according to claim 1, wherein the control unit performs a real-time zero point adjusting function of setting position and direction of the putter head as reference position and direction if the putter head does not moves in a Z axis direction for a predetermined time, displays the reference position and direction on the display unit, and displays a changed angle on the display unit in real time when the putter head rotates about the Z axis if the reference position and direction are set.

3. The digital putting diagnosis device according to claim 1, wherein the control unit displays the changed position and direction of the putter head on the display unit in different colors according to the changed position and direction of the putter head as the putter head rotates about a Z axis.

4. The digital putting diagnosis device according to claim 1, wherein the control unit displays the changed position and the direction of the putter head on the display unit in different colors according to a forward direction and a backward direction of the putter head as the putter head rotates about an X axis and a Y axis.

5. The digital putting diagnosis device according to claim 1, wherein the control unit reads an X axis value and a Y axis value of the putter head from the 9-axis sensor unit and displays the swing path of the putter head on the display unit in real time by using the values.

6. The digital putting diagnosis device according to claim 1, further comprising an alarm unit for outputting an alarm sound, wherein the control unit causes the alarm unit to output the alarm sound when the position and direction of the putter head coincide with a reference position and direction.

7. The digital putting diagnosis device according to claim 1, further comprising a vibration unit for outputting vibration, wherein the control unit causes the vibration unit to output the vibration when the position and direction of the putter head coincide with a reference position and direction.

* * * * *